(12) United States Patent
Liu

(10) Patent No.: US 9,906,120 B2
(45) Date of Patent: Feb. 27, 2018

(54) OVERCURRENT PROTECTION SYSTEM AND METHOD FOR INVERTER CIRCUIT

(71) Applicant: Huawei Technologies Co., Ltd., Shenzhen (CN)

(72) Inventor: Kelei Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/414,375

(22) Filed: Jan. 24, 2017

(65) Prior Publication Data

US 2017/0133925 A1 May 11, 2017

Related U.S. Application Data

(63) Continuation of application No. PCT/CN2015/083598, filed on Jul. 8, 2015.

(30) Foreign Application Priority Data

Jul. 25, 2014 (CN) .......................... 2014 1 0360242

(51) Int. Cl.
*H02M 1/32* (2007.01)
*H02M 7/537* (2006.01)
(Continued)

(52) U.S. Cl.
CPC .............. *H02M 1/32* (2013.01); *H02H 7/122* (2013.01); *H02M 1/08* (2013.01); *H02M 7/537* (2013.01); *H02M 2001/0009* (2013.01)

(58) Field of Classification Search
CPC .. H02M 1/08; H02M 2001/0009; H02M 1/32; H02M 7/537; H02H 7/122
See application file for complete search history.

(56) References Cited

U.S. PATENT DOCUMENTS

| 7,466,039 B2 | 12/2008 | Heath |
| 2014/0204636 A1 | 7/2014 | Liu et al. |

(Continued)

FOREIGN PATENT DOCUMENTS

| CN | 101529358 A | 9/2009 |
| CN | 102624273 A | 8/2012 |

(Continued)

*Primary Examiner* — Kyle J Moody
(74) *Attorney, Agent, or Firm* — Slater Matsil, LLP

(57) ABSTRACT

A overcurrent protection system includes an inductor current detection circuit configured to detect an inductor current in the inverter circuit to obtain an inductor current detection value, a pulse-by-pulse current limit enable signal generation circuit connected to the inductor current detection circuit and to the pulse-by-pulse current limit enable signal generation circuit, and configured to perform turn-off control on a switching transistor in the inverter circuit according to the pulse-by-pulse current limit enable signal, and a first instant-feeding load impact signal generation circuit connected to the pulse-by-pulse current limit enable signal generation circuit and configured to detect an inductor voltage in the inverter circuit to obtain an inductor voltage detection value, and generate an instant-feeding load impact signal in response to determining that the inductor voltage detection value reaches a preset voltage threshold.

14 Claims, 7 Drawing Sheets

(51) Int. Cl.
*H02M 1/08* (2006.01)
*H02H 7/122* (2006.01)
*H02M 1/00* (2006.01)

(56) References Cited

U.S. PATENT DOCUMENTS

| | | | |
|---|---|---|---|
| 2014/0253080 A1* | 9/2014 | Jiang | G05F 1/62 323/284 |
| 2017/0045555 A1* | 2/2017 | Liu | G01R 15/183 |
| 2017/0163026 A1* | 6/2017 | Yang | H02H 7/125 |

FOREIGN PATENT DOCUMENTS

| | | |
|---|---|---|
| CN | 102694479 A | 9/2012 |
| CN | 102739090 A | 10/2012 |
| CN | 102868291 A | 1/2013 |
| CN | 103280960 A | 9/2013 |
| CN | 203674694 U | 6/2014 |
| CN | 104104062 A | 10/2014 |
| EP | 2698911 A1 | 2/2014 |

* cited by examiner

OVERCURRENT PROTECTION SYSTEM AND METHOD FOR INVERTER CIRCUIT

CROSS-REFERENCE TO RELATED APPLICATIONS

This application is a continuation of International Application No. PCT/CN2015/083598, filed on Jul. 8, 2015, which claims priority to Chinese Patent Application No. 201410360242.1, filed on Jul. 25, 2014. The disclosures of the aforementioned applications are hereby incorporated by reference in their entireties.

TECHNICAL FIELD

Embodiments of the present application relate to electronics technologies, and in particular, to an overcurrent protection system and method for an inverter circuit.

BACKGROUND

An inverter is an apparatus that uses a power tube component to convert a direct current into an alternating current, which is used by an alternating current load. In recent years, with rapid development of electronics and electrical technologies, an inverter power supply has been widely applied to fields such as daily life, in-vehicle systems, and posts and telecommunications.

An inverter mainly includes an inverter bridge, control logic, and a filter circuit. In an instant that a load circuit is connected to an inverter circuit by using the filter circuit, especially when a serious reverse sag in an output voltage is caused when the load circuit is a capacitive load, a relatively high surge current is generated in the inverter circuit, and a current increases in a relatively short time. A power tube component in the inverter is usually damaged because of overcurrent. Therefore, each existing inverter apparatus is provided with an overcurrent protection circuit. An inductor current detection circuit of the inverter obtains an inductor current by means of sampling. A comparator circuit is used to compare an inductor current sampled value with a fixed current limit threshold. When the inductor current sampled value is greater than the current limit threshold, a power tube is turned off according to a specific time sequence, so that the power tube is prevented from being burnt because of overcurrent.

However, during the foregoing process, a specific transmission delay $\Delta t$ (mainly including an inherent latency of a component in a signal transmission line and a dejittering delay of a signal) exists between a time point when the inductor current sampled value is greater than the current limit threshold and a time point when the power tube is successfully turned off; therefore, $\Delta t*di/dt$ causes quite large $\Delta i$. Assuming that the current limit threshold is $I_0$, an actual current of the power tube during current limiting is $I_0+\Delta i$. Especially, in an inverter circuit with a smaller inductor value, the power tube bears larger current stress, resulting in damage to the power tube. A present current limiting method has an undesirable overcurrent protection effect for an inverter, and has low reliability

SUMMARY

Embodiments of the present application provide an overcurrent protection system and method for an inverter circuit.

According to a first aspect, an embodiment of the present application provides an overcurrent protection system for an inverter circuit, including an inductor current detection circuit, configured to detect an inductor current in the inverter circuit, to obtain an inductor current detection value, a pulse-by-pulse current limit enable signal generation circuit, connected to the inductor current detection circuit. The pulse-by-pulse current limit enable signal generation circuit is configured to reduce a current limit threshold according to an instant-feeding load impact signal, compare a current limit threshold obtained after reduction processing with a voltage value corresponding to the inductor current detection value, and, if it is determined that the voltage value corresponding to the inductor current detection value reaches the current limit threshold, output a pulse-by-pulse current limit enable signal. The inverter circuit further includes a control circuit, connected to the pulse-by-pulse current limit enable signal generation circuit, and configured to perform turn-off control on a switching transistor in the inverter circuit according to the pulse-by-pulse current limit enable signal, and a first instant-feeding load impact signal generation circuit, connected to the pulse-by-pulse current limit enable signal generation circuit, and configured to detect an inductor voltage in the inverter circuit, to obtain an inductor voltage detection value; and if it is determined that the inductor voltage detection value reaches a preset voltage threshold, generate the instant-feeding load impact signal.

With reference to the first aspect, in a first possible implementation manner of the first aspect, the first instant-feeding load impact signal generation circuit includes a voltage detection circuit, configured to detect the inductor voltage in the inverter circuit, to obtain the inductor voltage detection value, and a first load impact enable signal generation circuit, separately connected to the voltage detection circuit and the pulse-by-pulse current limit enable signal generation circuit, and configured to compare the inductor voltage detection value with the preset voltage threshold, and, if it is determined that the inductor voltage detection value reaches the preset voltage threshold, generate the instant-feeding load impact signal.

With reference to the first aspect or the first possible implementation manner of the first aspect, in a second possible implementation manner of the first aspect, the control circuit includes a level conversion circuit, connected to the pulse-by-pulse current limit enable signal generation circuit, and configured to perform level conversion on the pulse-by-pulse current limit enable signal, to obtain an overcurrent logic signal, and a pulse-by-pulse current-limited circuit, connected to the level conversion circuit, and configured to perform turn-off control on the switching transistor in the inverter circuit according to the overcurrent logic signal.

With reference to the first aspect, the first possible implementation manner of the first aspect, or the second possible implementation manner of the first aspect, in a third possible implementation manner of the first aspect, the overcurrent protection system further includes a second instant-feeding load impact signal generation circuit, connected to the pulse-by-pulse current limit enable signal generation circuit, and configured to detect an output current in the inverter circuit, to obtain an output-current detection value, and, if it is determined that the output-current detection value reaches a preset current threshold, generate the instant-feeding load impact signal. The second instant-feeding load impact signal generation circuit further includes a selection circuit, separately connected to the first instant-feeding load impact signal generation circuit, the second instant-feeding load impact signal generation circuit, and the pulse-by-pulse current limit enable signal generation circuit, and configured to select the instant-feeding load impact signal generated by the first instant-feeding load impact signal generation circuit or the second instant-feeding load impact signal generation circuit to be output to the pulse-by-pulse current limit enable signal generation circuit.

With reference to the third possible implementation manner of the first aspect, in a fourth possible implementation manner of the first aspect, the second instant-feeding load impact signal generation circuit includes a current detection circuit, configured to detect the output current in the inverter circuit, to obtain the output-current detection value, and a second load impact enable signal generation circuit, separately connected to the current detection circuit and the pulse-by-pulse current limit enable signal generation circuit, and configured to compare the output-current detection value with the preset current threshold; and if it is determined that the output-current detection value reaches the preset current threshold, generate the instant-feeding load impact signal.

According to a second aspect, an embodiment of the present application provides an overcurrent protection method for an inverter circuit, including detecting an inductor current in the inverter circuit, to obtain an inductor current detection value, reducing a current limit threshold according to an instant-feeding load impact signal, comparing a current limit threshold obtained after reduction processing with a voltage value corresponding to the inductor current detection value, and, if it is determined that the voltage value corresponding to the inductor current detection value reaches the current limit threshold, outputting a pulse-by-pulse current limit enable signal. The method further includes performing turn-off control on a switching transistor in the inverter circuit according to the pulse-by-pulse current limit enable signal, and detecting an inductor voltage in the inverter circuit, to obtain an inductor voltage detection value; and if it is determined that the inductor voltage detection value reaches a preset voltage threshold, generating the instant-feeding load impact signal.

With reference to the second aspect, in a first possible implementation manner of the second aspect, the performing turn-off control on a switching transistor in the inverter circuit according to the pulse-by-pulse current limit enable signal includes performing level conversion on the pulse-by-pulse current limit enable signal, to obtain an overcurrent logic signal, and performing turn-off control on the switching transistor in the inverter circuit according to the overcurrent logic signal.

With reference to the second aspect or the first possible implementation manner of the second aspect, in a third possible implementation manner of the second aspect, the overcurrent protection method further includes detecting an output current in the inverter circuit, to obtain an output-current detection value, and if it is determined that the output-current detection value reaches a preset current threshold, generating the instant-feeding load impact signal.

According to a third aspect, an embodiment of the present application provides an overcurrent protection system for an inverter circuit, including a first current-limited circuit, configured to obtain an inductor current detection value, compare the inductor current detection value with a first preset current limit threshold, and, if the inductor current detection value reaches the first preset current limit threshold, output a first overcurrent logic signal. The overcurrent protection system for the inverter circuit further includes a second current-limited circuit, configured to obtain an inductor voltage detection value, compare the inductor voltage detection value with a second preset current limit threshold, and, if the inductor voltage detection value reaches the second preset current limit threshold, output a second overcurrent logic signal. The overcurrent protection system for the inverter circuit further includes a pulse-by-pulse current-limited circuit, connected to the first current-limited circuit and the second current-limited circuit, and configured to perform an OR logical operation between the first overcurrent logic signal and the second overcurrent logic signal, to generate an overcurrent logic signal, and perform turn-off control on a switching transistor in the inverter circuit according to the overcurrent logic signal.

With reference to the third aspect, in a first possible implementation manner of the third aspect, the first current-limited circuit includes an inductor current detection circuit, configured to detect an inductor current in the inverter circuit to obtain the inductor current detection value, a first pulse-by-pulse current limit enable signal generation circuit, connected to the inductor current detection circuit, and configured to compare a voltage value corresponding to the inductor current detection value with the first preset current limit threshold, and, if it is determined that the voltage value corresponding to the inductor current detection value reaches the first preset current limit threshold, generate a first pulse-by-pulse current limit enable signal. The first current-limited circuit further includes a first level conversion circuit, separately connected to the first pulse-by-pulse current limit enable signal generation circuit and the OR logic circuit, and configured to perform level conversion on the first pulse-by-pulse current limit enable signal, and output the first overcurrent logic signal.

With reference to the third aspect or the first possible implementation manner of the third aspect, in a second possible implementation manner of the third aspect, the second current-limited circuit includes an inductor voltage detection circuit, configured to detect an inductor voltage in the inverter circuit, to obtain the inductor voltage detection value, a second pulse-by-pulse current limit enable signal generation circuit, connected to the inductor voltage detection circuit, and configured to compare the inductor voltage detection value with the second preset current limit threshold, and, if it is determined that the inductor voltage detection value reaches the second preset current limit threshold, generate a second pulse-by-pulse current limit enable signal. The second current-limited circuit further includes a second level conversion circuit, separately connected to the second pulse-by-pulse current limit enable signal generation circuit and the OR logic circuit, and configured to perform level conversion on the second pulse-by-pulse current limit enable signal, and output the second overcurrent logic signal.

According to a fourth aspect, an embodiment of the present application provides an overcurrent protection method for an inverter circuit, including obtaining an inductor current detection value; comparing the inductor current detection value with a first preset current limit threshold; and if the inductor current detection value reaches the first preset current limit threshold, outputting a first overcurrent logic signal, obtaining an inductor voltage detection value; comparing the inductor voltage detection value with a second preset current limit threshold; and if the inductor voltage detection value reaches the second preset current limit threshold, outputting a second overcurrent logic signal, performing an OR logical operation between the first overcurrent logic signal and the second overcurrent logic signal, and outputting an overcurrent logic signal, and performing turn-off control on a switching transistor in the inverter circuit according to the overcurrent logic signal.

With reference to the fourth aspect, in a first possible implementation manner of the fourth aspect, the obtaining an inductor current detection value, comparing the inductor current detection value with a first preset current limit threshold, and if the inductor current detection value reaches the first preset current limit threshold, outputting a first overcurrent logic signal includes detecting an inductor current in the inverter circuit, to obtain the inductor current detection value, comparing a voltage value corresponding to the inductor current detection value with the first preset current limit threshold; and if it is determined that the voltage value corresponding to the inductor current detection value reaches the first preset current limit threshold, generating a first pulse-by-pulse current limit enable signal, and performing level conversion on the first pulse-by-pulse current limit enable signal, and outputting the first overcurrent logic signal.

With reference to the fourth aspect or the first possible implementation manner of the fourth aspect, in a second possible implementation manner of the fourth aspect, the obtaining an inductor voltage detection value; comparing the inductor voltage detection value with a second preset current limit threshold; and if the inductor voltage detection value reaches the second preset current limit threshold, outputting a second overcurrent logic signal includes detecting an inductor voltage in the inverter circuit, to obtain the inductor voltage detection value, comparing the inductor voltage detection value with the second preset current limit threshold; and if it is determined that the inductor voltage detection value reaches the second preset current limit threshold, generating a second pulse-by-pulse current limit enable signal, and performing level conversion on the second pulse-by-pulse current limit enable signal, and outputting the second overcurrent logic signal.

According to the overcurrent protection system and method for an inverter circuit in the embodiments of the present application, an instant-feeding load impact signal is generated according to a comparison result of a voltage between two ends of an inductor and a preset voltage threshold, a current limit threshold is reduced by a pulse-by-pulse current limit enable signal generation circuit, a pulse-by-pulse current limit enable signal is output according to a reduced current limit threshold, and turn-off control is performed on a switching transistor according to the pulse-by-pulse current limit enable signal, so that current limiting protection for the switching transistor is implemented in advance by reducing the current limit threshold, thereby preventing damage to the switching transistor that is caused by overcurrent when the switching transistor is actually turned off. The overcurrent protection system for the inverter circuit is used to implement current limiting protection for the switching transistor, and has high reliability.

BRIEF DESCRIPTION OF THE DRAWINGS

To describe the technical solutions in the embodiments of the present application more clearly, the following briefly describes the accompanying drawings required for describing the embodiments or the prior art. Apparently, the accompanying drawings in the following description show some embodiments of the present application, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

Figure 1:
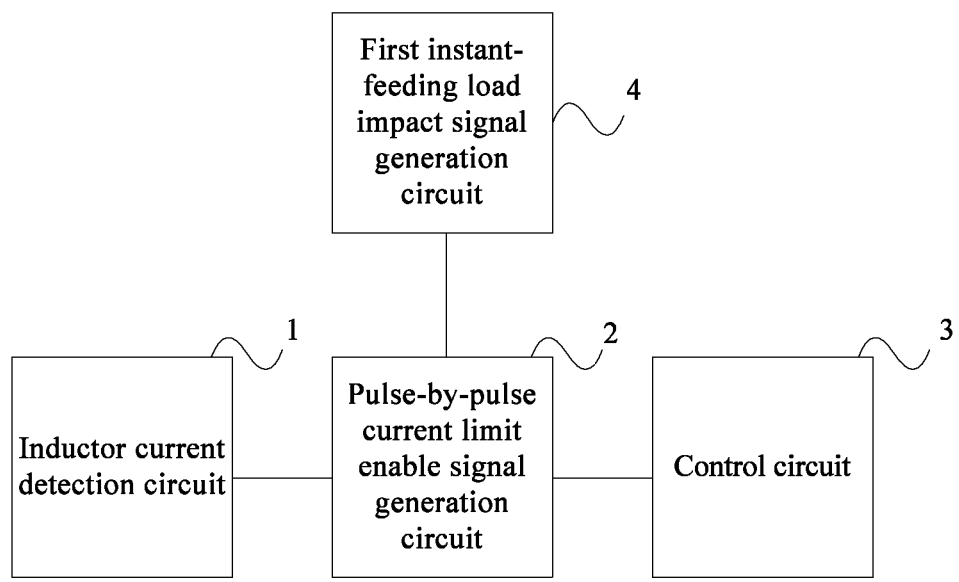
FIG. 1 is a schematic structural diagram of Embodiment 1 of an overcurrent protection system for an inverter circuit according to the present application.

FIG. 1 is a schematic structural diagram of Embodiment 1 of an overcurrent protection system for an inverter circuit according to the present application. As shown in FIG. 1, the overcurrent protection system for the inverter circuit in this embodiment may include: an inductor current detection circuit 1, a pulse-by-pulse current limit enable signal generation circuit 2, a control circuit 3, and a first instant-feeding load impact signal generation circuit 4. The inductor current detection circuit 1 is connected to the pulse-by-pulse current limit enable signal generation circuit 2, the pulse-by-pulse current limit enable signal generation circuit 2 is connected to the control circuit 3, and the first instant-feeding load impact signal generation circuit 4 is connected to the pulse-by-pulse current limit enable signal generation circuit 2.

The inductor current detection circuit 1 is configured to detect an inductor current in the inverter circuit, to obtain an inductor current detection value.

The pulse-by-pulse current limit enable signal generation circuit 2 is configured to reduce a current limit threshold according to an instant-feeding load impact signal; compare a current limit threshold obtained after reduction processing with a voltage value corresponding to the inductor current detection value; and if it is determined that the voltage value corresponding to the inductor current detection value reaches the current limit threshold, output a pulse-by-pulse current limit enable signal.

The control circuit 3 is configured to perform turn-off control on a switching transistor in the inverter circuit according to the pulse-by-pulse current limit enable signal.

Specifically, turn-on or turn-off of the switching transistor is controlled according to the pulse-by-pulse current limit enable signal by using a pPulse Width Modulation (PWM) principle. That is, the control circuit 3 performs turn-off control on the switching transistor according to the pulse-by-pulse current limit enable signal when the pulse-by-pulse current limit enable signal generation circuit 2 outputs the pulse-by-pulse current limit enable signal if the voltage value corresponding to the inductor current detection value reaches the current limit threshold; or the control circuit 3 resumes normal on-off control on the switching transistor if the voltage value corresponding to the inductor current detection value does not reach the current limit threshold.

The first instant-feeding load impact signal generation circuit 4 is configured to detect an inductor voltage in the inverter circuit, to obtain an inductor voltage detection value; and if it is determined that the inductor voltage detection value reaches a preset voltage threshold, generate the instant-feeding load impact signal.

The instant-feeding load impact signal may be a pulse signal. The pulse-by-pulse current limit enable signal generation circuit 2 may reduce the current limit threshold according to the pulse signal.

A specific implementation manner for implementing current limiting protection for the inverter circuit by using the foregoing overcurrent protection system for the inverter circuit may be as follows. The first instant-feeding load impact signal generation circuit 4 detects the inductor voltage in the inverter circuit, to obtain the inductor voltage detection value, compares the inductor voltage detection value with the preset voltage threshold, and when the inductor voltage detection value is greater than or equal to the preset voltage threshold, generates the instant-feeding load impact signal. The pulse-by-pulse current limit enable signal generation circuit 2 reduces the current limit threshold according to the instant-feeding load impact signal; compares the current limit threshold obtained after reduction processing with the voltage value corresponding to the inductor current detection value obtained by the inductor current detection circuit 1, and if the voltage value corresponding to the inductor current detection value reaches the current limit threshold, outputs the pulse-by-pulse current limit enable signal to the control circuit 3. The control circuit turns off the switching transistor in the inverter circuit according to the pulse-by-pulse current limit enable signal.

An inductor voltage is ahead of an inductor current. Therefore, when learning that a voltage between two ends of an inductor reaches the preset voltage threshold, the first instant-feeding load impact signal generation circuit 4 in the foregoing overcurrent protection system for the inverter circuit may learn that the inductor voltage $U_L$ is greater than or equal to the preset voltage threshold $U_{L\_RE}$. It can be learnt from an inductor characteristic $U_L=LdI/dt$ that, $dI=U_Ldt/L$, that is, the inductor current I also varies after a specific time. Especially when L is smaller, the inductor current changes more greatly. The instant-feeding load impact signal is generated according to a comparison result of the voltage between the two ends of the inductor and the preset voltage threshold. The pulse-by-pulse current limit enable signal generation circuit reduces the current limit threshold, and outputs the pulse-by-pulse current limit enable signal according to the reduced current limit threshold. The control circuit performs turn-off control on the switching transistor according to the pulse-by-pulse current limit enable signal, so that current limiting protection for the switching transistor is implemented in advance by reducing the current limit threshold. In this way, the following problem is alleviated: Due to a circuit limitation, during a current limiting protection operation performed for the switching transistor when it is detected that the inductor current is greater than an overcurrent protection reference current, a delay Δt cannot be eliminated before the current limiting protection operation takes effect. In the foregoing solutions of this embodiment, the current limiting protection operation takes effect before the inductor current is greater than the overcurrent protection reference current, thereby preventing damage to the switching transistor that is caused by overcurrent when the switching transistor is actually turned off. The overcurrent protection system for the inverter circuit is used to implement current limiting protection for the switching transistor, and has high reliability.

Figure 2:
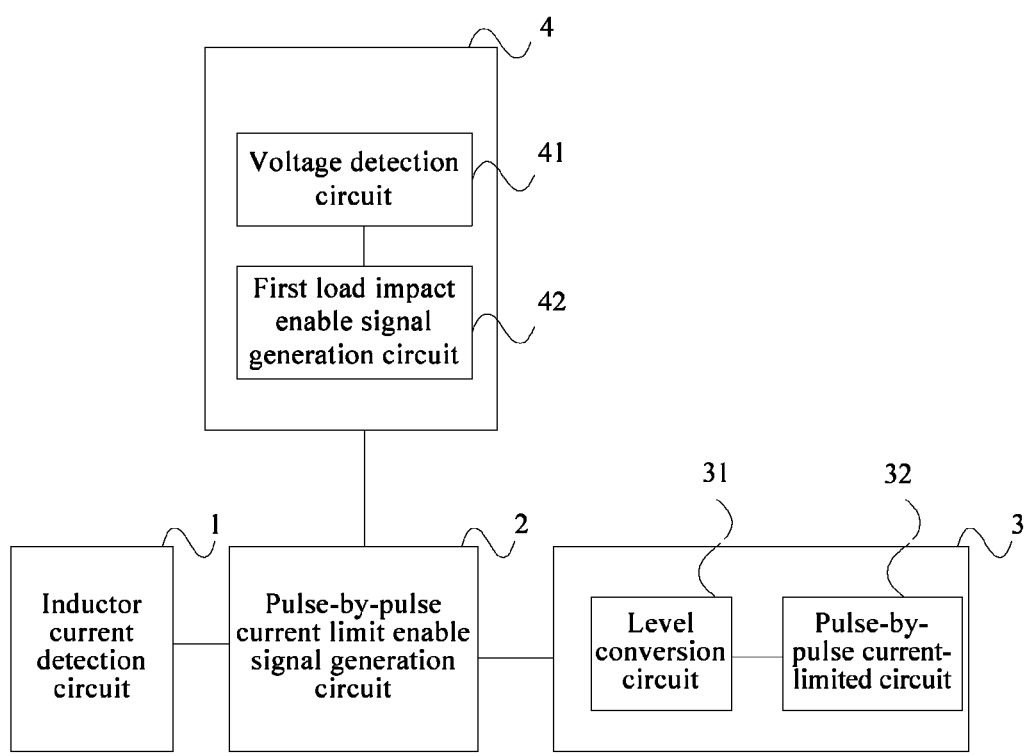
FIG. 2 is a schematic structural diagram of Embodiment 2 of an overcurrent protection system for an inverter circuit according to the present application.

FIG. 2 is a schematic structural diagram of Embodiment 2 of an overcurrent protection system for an inverter circuit according to the present application. As shown in FIG. 2, the overcurrent protection system for the inverter circuit in this embodiment is based on Embodiment 1. The first instant-feeding load impact signal generation circuit 4 may specifically include a voltage detection circuit 41 and a first load impact enable signal generation circuit 42. The control circuit 3 may specifically include a level conversion circuit 31 and a pulse-by-pulse current-limited circuit 32.

The voltage detection circuit 41 acts on two ends of an inductor in the inverter circuit, and is configured to detect an inductor voltage in the inverter circuit, to obtain an inductor voltage detection value. The first load impact enable signal generation circuit 42 is separately connected to the voltage detection circuit 41 and the pulse-by-pulse current limit enable signal generation circuit 2, and is configured to compare the inductor voltage detection value with a preset voltage threshold, and if it is determined that the inductor voltage detection value reaches the preset voltage threshold, generate an instant-feeding load impact signal.

The level conversion circuit 31 is connected to the pulse-by-pulse current limit enable signal generation circuit 2, and is configured to perform level conversion on a pulse-by-pulse current limit enable signal, to obtain an overcurrent logic signal. The pulse-by-pulse current-limited circuit 32 is connected to the level conversion circuit 31, and is configured to perform turn-off control on a switching transistor in the inverter circuit according to the overcurrent logic signal.

An implementation manner for implementing current limiting protection for the inverter circuit by using the foregoing overcurrent protection system for the inverter circuit is as follows. The voltage detection circuit 41 detects the inductor voltage in the inverter circuit, to obtain the inductor voltage detection value. The first load impact enable signal generation circuit 42 compares the inductor voltage detection value with the preset voltage threshold; and if it is determined that the inductor voltage detection value is greater than or equal to the preset voltage threshold, generates the instant-feeding load impact signal. The pulse-by-pulse current limit enable signal generation circuit 2 reduces a current limit threshold according to the instant-feeding load impact signal; compares a current limit threshold obtained after reduction processing with a voltage value corresponding to an inductor current detection value obtained by the inductor current detection circuit 1; and if the voltage value corresponding to the inductor current detection value reaches the current limit threshold, outputs the pulse-by-pulse current limit enable signal to the level conversion circuit 31. The level conversion circuit 31 performs level conversion on the pulse-by-pulse current limit enable signal, to obtain the overcurrent logic signal; and outputs the overcurrent logic signal to the pulse-by-pulse current-limited circuit 32. The pulse-by-pulse current-limited circuit 32 performs turn-off control on the switching transistor in the inverter circuit according to the overcurrent logic signal.

A characteristic that the inductor voltage is ahead of the inductor current is used. When the inductor voltage exceeds the preset voltage threshold, the instant-feeding load impact signal is generated; and the current limit threshold for comparison with the inductor current detection value is reduced according to the instant-feeding load impact signal, so that current limiting protection can be implemented in advance, and timeliness of current limit can be ensured, thereby preventing damage to the switching transistor that is caused by overcurrent when the switching transistor is actually turned off. When the inductor voltage does not exceed the preset voltage threshold, the current limit threshold may be gradually resumed to an initial state, so that a steady-state loading capability of the inverter circuit may not be affected.

The following describes the technical solutions of the foregoing embodiment in detail by using a specific embodiment.

Figure 3:
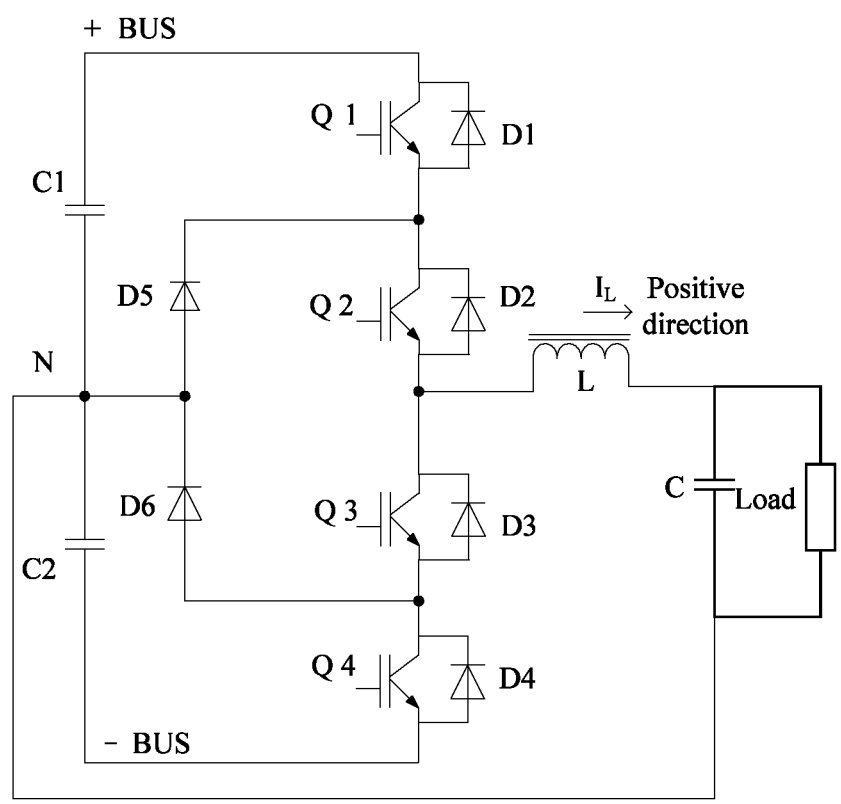
FIG. 3 is a schematic diagram of a topology structure of a tri-level inverter circuit.
Figure 4:
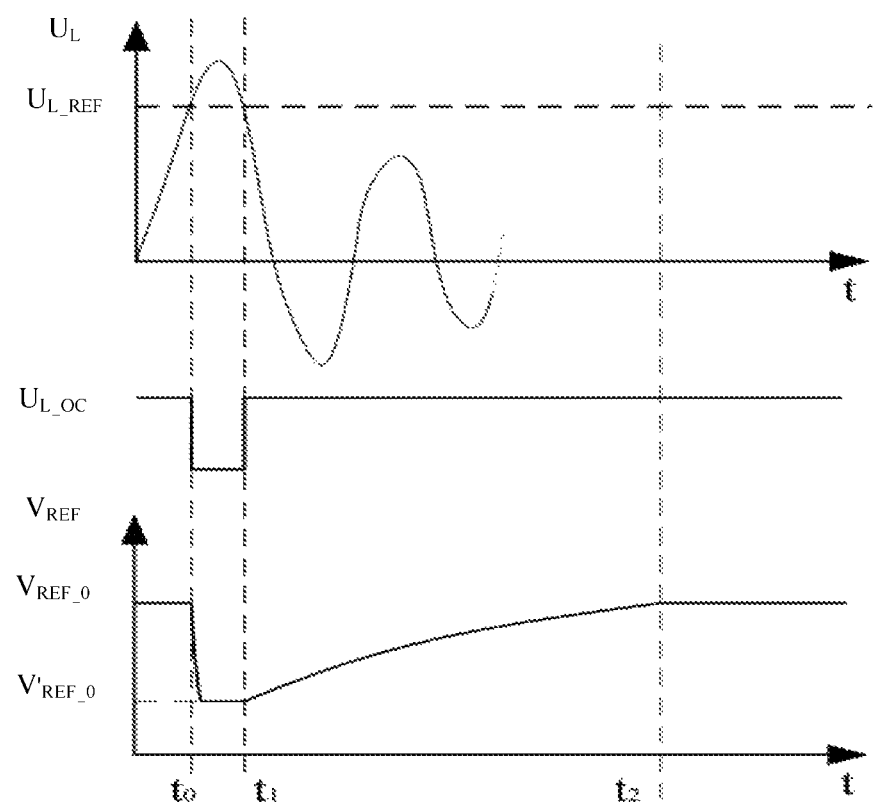
FIG. 4 is a schematic diagram of waveforms of an inductor voltage and a current limit threshold in an inverter circuit.

FIG. 3 is a schematic diagram of a topology structure of a tri-level inverter circuit. FIG. 4 is a schematic diagram of waveforms of an inductor voltage and a current limit threshold in an inverter circuit. The foregoing overcurrent protection system for the inverter circuit is applied to the inverter circuit shown in FIG. 3. In FIG. 3, L is an inductor in the inverter circuit, Q1, Q2, Q3, and Q4 are switching transistors in the inverter circuit, load represents a load, and C is an output capacitor.

When the foregoing inverter circuit is connected to a non-linear load, that is, when load is a non-linear load, the output capacitor C performs electric discharging on the load, causing a voltage $U_L$ between two ends of the inductor L to increase rapidly. The voltage detection circuit 41 in the overcurrent protection system for the inverter circuit obtains the voltage value $U_L$ between the two ends of the inductor. As shown in FIG. 4, $U_L$ begins to increase rapidly from a time point 0. $U_L$ reaches $U_{L\_RE}F$ at a time point $t_0$, keeps $U_{L\_RE}F$ from the time point $t_0$ to a time point $t_1$, and is smaller than $U_{L\_RE}F$ after the time point $t_1$. Therefore, from the time point $t_0$ to the time point $t_1$, the first load impact enable signal generation circuit 42 generates an instant-feeding load impact signal $U_{L\_OC}$. A waveform diagram of the instant-feeding load impact signal $U_{L\_OC}$ is shown in FIG. 4. Herein, a low level of $U_{L\_OC}$ is set to active, and an active instant-feeding load impact signal is generated between the time point $t_0$ and the time point $t_1$. Due to a function of the active instant-feeding load impact signal $U_{L\_OC}$, the pulse-by-pulse current limit enable signal generation circuit 2 reduces a current limit threshold $V_{REF}$ according to the instant-feeding load impact signal. Herein, an initial current limit threshold is $V_{REF\_0}$. From the time point $t_0$, the pulse-by-pulse current limit enable signal generation circuit 2 reduces $VR_{REF\_0}$, to reduce the current limit threshold to $V'_{REF\_0}$ in a relatively short time; compares a voltage value corresponding to an inductor current detection value $I_L$ obtained by the inductor current detection circuit 1 with $V'_{REF\_0}$; and if the voltage value corresponding to the inductor current detection value $I_L$ is greater than or equal to $V'_{REF\_0}$, outputs a pulse-by-pulse current limit enable signal. The level conversion circuit 31 performs level conversion on the pulse-by-pulse current limit enable signal, to obtain an overcurrent logic signal. The pulse-by-pulse current-limited circuit performs turn-off control on the switching transistor in the inverter circuit according to the overcurrent logic signal. It can be learnt from the schematic diagram of the waveform of the current limit threshold shown in FIG. 4 that, after the time point $t_1$, the instant-feeding load impact signal becomes inactive; therefore, the current limit threshold $V_{REF}$ is gradually resumed to the initial current limit threshold $V_{REF\_0}$ so that a steady-state loading capability of the inverter circuit may not be affected.

Figure 5:
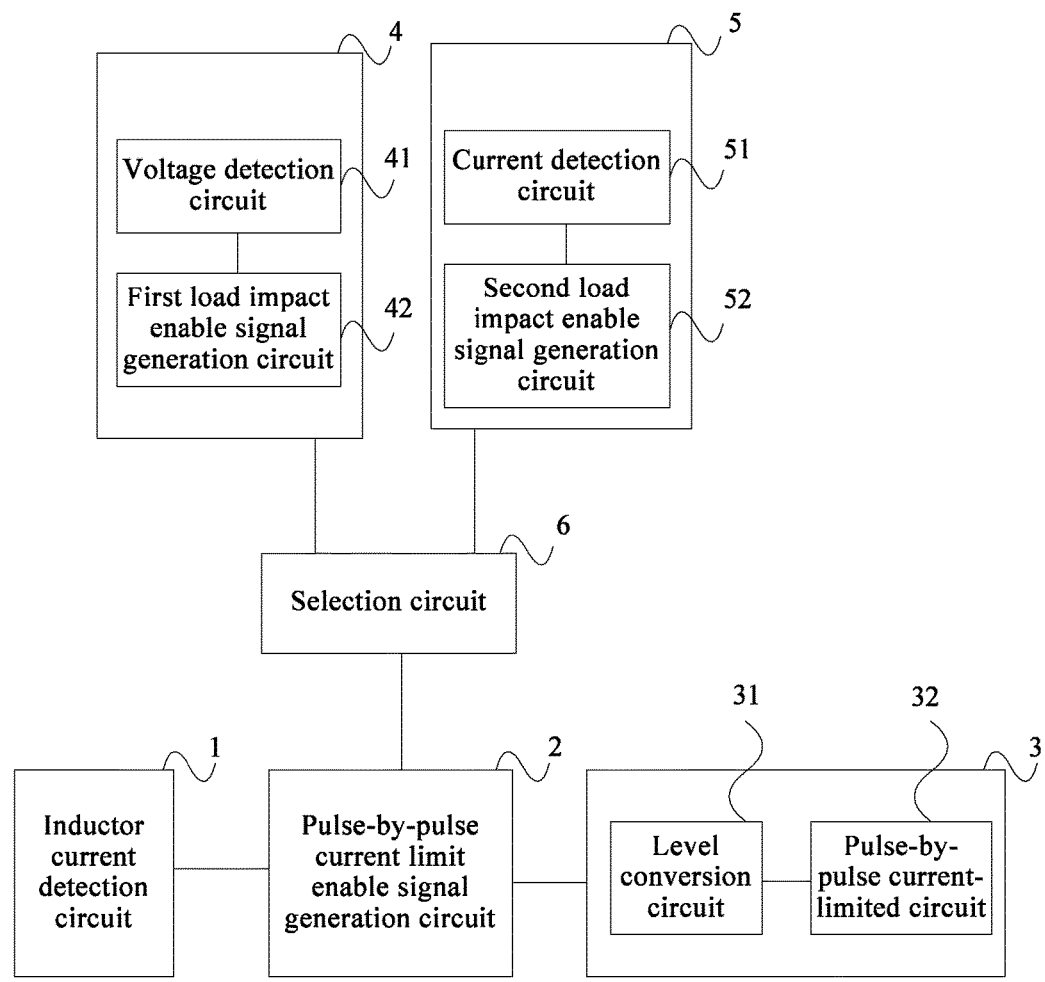
FIG. 5 is a schematic structural diagram of Embodiment 3 of an overcurrent protection system for an inverter circuit according to the present application.

FIG. 5 is a schematic structural diagram of Embodiment 3 of an overcurrent protection system for an inverter circuit according to the present application. In this embodiment, based on FIG. 1 or FIG. 2, the overcurrent protection system may further include a second instant-feeding load impact signal generation circuit 5 and a selection circuit 6.

The second instant-feeding load impact signal generation circuit 5 is connected to the pulse-by-pulse current limit enable signal generation circuit 2, and is configured to detect an output current in the inverter circuit, to obtain an output-current detection value; and if it is determined that the output-current detection value reaches a preset current threshold, generate an instant-feeding load impact signal, that is, generate the instant-feeding load impact signal according to the output-current detection value. The output current in the inverter circuit is ahead of the inductor current; therefore, the instant-feeding load impact signal may be generated after a detection of the output current, so that current limiting protection is performed on a switching transistor in the inverter circuit in advance. The selection circuit 6 is separately connected to the first instant-feeding load impact signal generation circuit 4, the second instant-feeding load impact signal generation circuit 5, and the pulse-by-pulse current limit enable signal generation circuit 2, and is configured to select the instant-feeding load impact signal generated by the first instant-feeding load impact signal generation circuit 4 or the second instant-feeding load impact signal generation circuit 5 to be output to the pulse-by-pulse current limit enable signal generation circuit 2. That is, there is an instant-feeding load impact signal to be output to the pulse-by-pulse current limit enable signal generation circuit 2, provided that instant-feeding load impact information includes the instant-feeding load impact signal that is generated by the first instant-feeding load impact signal generation circuit 4 according to the inductor voltage and/or the instant-feeding load impact signal that is generated by the second instant-feeding load impact signal generation circuit 5 according to the output current.

Optionally, the second instant-feeding load impact signal generation circuit 5 may include a current detection circuit 51, configured to detect the output current in the inverter circuit, to obtain the output-current detection value; and a second load impact enable signal generation circuit 52, separately connected to the current detection circuit 51 and the pulse-by-pulse current limit enable signal generation circuit 2, and configured to compare the output-current detection value with the preset current threshold; and if it is determined that the output-current detection value reaches the preset current threshold, generate the instant-feeding load impact signal.

In this embodiment, based on the overcurrent protection system for the inverter circuit in FIG. 1 or FIG. 2, a second instant-feeding load impact signal generation circuit 5 and a selection circuit 6 are added, so that an instant-feeding load impact signal can be generated according to an inductor voltage detection value, or an instant-feeding load impact signal can be generated according to an output current. In this way, a pulse-by-pulse current limit enable signal generation circuit 2 reduces a current limit threshold according to the instant-feeding load impact signal; compares a current limit threshold obtained after reduction processing with a voltage corresponding to an inductor current detection value; and when the voltage value corresponding to the inductor current detection value reaches the current limit threshold obtained after reduction processing, outputs a pulse-by-pulse current limit enable signal. A control circuit 3 performs turn-off control on a switching transistor in the inverter circuit according to the pulse-by-pulse current limit enable signal, so that current limiting protection for the switching transistor can be implemented in advance, and timeliness of current limit can be ensured, thereby preventing damage to the switching transistor that is caused by overcurrent when the switching transistor is actually turned off. The overcurrent protection system for the inverter circuit has high reliability.

Figure 6:
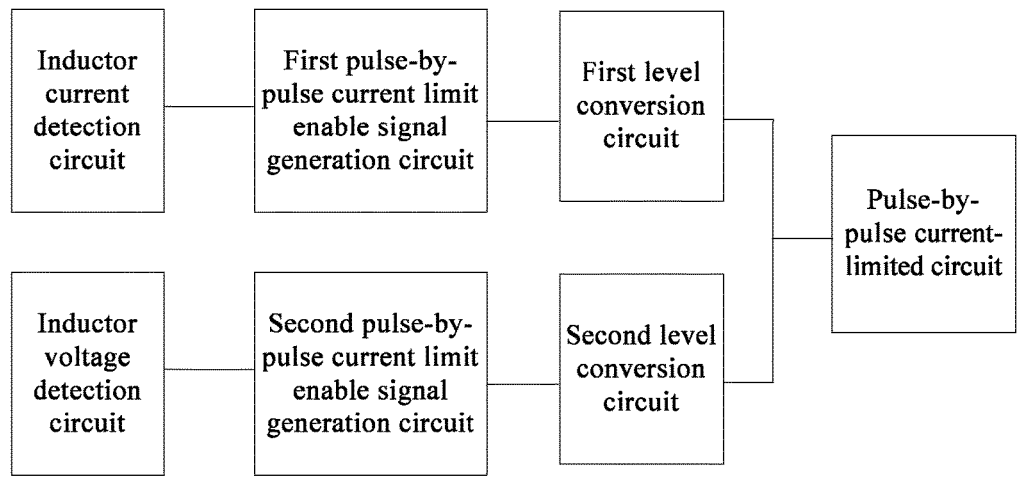
FIG. 6 is a schematic structural diagram of Embodiment 4 of an overcurrent protection system for an inverter circuit according to the present application.

FIG. 6 is a schematic structural diagram of Embodiment 4 of an overcurrent protection system for an inverter circuit according to the present application. As shown in FIG. 6, the overcurrent protection system for the inverter circuit in this embodiment may include a first current-limited circuit and a second current-limited circuit. The first current-limited circuit is connected to the second current-limited circuit and a pulse-by-pulse current-limited circuit.

The first current-limited circuit may include an inductor current detection circuit, a first pulse-by-pulse current limit enable signal generation circuit, and a first level conversion circuit. The inductor current detection circuit is configured to detect an inductor current in the inverter circuit, to obtain an inductor current detection value. The first pulse-by-pulse current limit enable signal generation circuit is configured to compare a first preset current limit threshold with a voltage value corresponding to the inductor current detection value, where the first preset current limit threshold is a fixed reference voltage; and if it is determined that the voltage value corresponding to the inductor current detection value reaches the first preset current limit threshold, output a pulse-by-pulse current limit enable signal. The first level conversion circuit is configured to perform level conversion on the pulse-by-pulse current limit enable signal, to obtain a first overcurrent logic signal.

The second current-limited circuit may include an inductor voltage detection circuit, a second pulse-by-pulse current limit enable signal generation circuit, and a second level conversion circuit. The inductor voltage detection circuit is configured to detect an inductor voltage in the inverter circuit, to obtain an inductor voltage detection value. The second pulse-by-pulse current limit enable signal generation circuit is configured to compare a second preset current limit threshold with the inductor voltage detection value, where the second preset current limit threshold is a fixed reference voltage; and if it is determined that the inductor voltage detection value reaches the second preset current limit threshold, output a pulse-by-pulse current limit enable signal. The second level conversion circuit is configured to perform level conversion on the pulse-by-pulse current limit enable signal, to obtain a second overcurrent logic signal.

The pulse-by-pulse current-limited circuit performs turn-off control on a switching transistor in the inverter circuit according to an overcurrent logic signal that is generated after an OR logical operation is performed between the first overcurrent logic signal and the second overcurrent logic signal. The OR logical operation performed between the first overcurrent logic signal and the second overcurrent logic signal may specifically be implemented by means of a software operation. Certainly, it may be understood that, a corresponding OR logical operation circuit may alternatively be disposed to perform the OR operation between the two overcurrent logic signals.

After the OR operation is performed between the first overcurrent logic signal and the second overcurrent logic signal by using an OR logic circuit, a result is output to the pulse-by-pulse current-limited circuit.

In this embodiment, two current-limited circuits are used to implement overcurrent protection for the inverter circuit. First, an inductor current is detected for protection: When the inductor current reaches a specified threshold, an inverter enters an overcurrent protection state; otherwise, the inverter works normally. Second, a voltage between two ends of an inductor is used for protection: When the voltage between the two ends of the inductor abruptly changes to a specified threshold, the inverter enters an overcurrent protection state; otherwise, the inverter works normally.

Specifically, the inductor voltage in the inverter circuit is detected, and the inductor voltage detection value is compared with the preset voltage value. When the inductor voltage detection value is greater than the preset voltage value, the pulse-by-pulse current limit enable signal is generated. An inductor has a characteristic that a voltage between two ends of the inductor is ahead of an inductor current. When the voltage between the two ends of the inductor surges, it indicates that the current passing through the inductor will gradually increase. Therefore, according to a basic physical formula $U_L=LdI/dt$ and the characteristic of the inductor in the circuit, a voltage may be preset. When the voltage between the two ends of the inductor in the circuit reaches this value, the system turns off the switching transistor, and enters a current-limited state. Otherwise, the system works normally.

However, it can also be learnt from the basic physical formula $U_L=LdI/dt$ that, when the voltage between the two ends of the inductor is not greater than the preset voltage value, the current passing through the two ends of the inductor also reaches a relatively high current value as long as there is enough time. Therefore, in addition, the inductor current in the inverter circuit is detected, and the voltage corresponding to the inductor current detection value is compared with the preset current limit threshold. When voltage value corresponding to the inductor current detection value reaches the preset current limit threshold, the pulse-by-pulse current limit enable signal is also output. The two circuits work simultaneously. When any circuit triggers a current-limited circuit, the system turns off the switching transistor in the inverter, and enters a current-limited state. The two current-limited circuits work in "OR" logic. OR logic may be implemented by the OR logic circuit, or may be implemented by determining by means of software, that is, a controller is used to detect output values of the two current-limited circuits.

Figure 7:
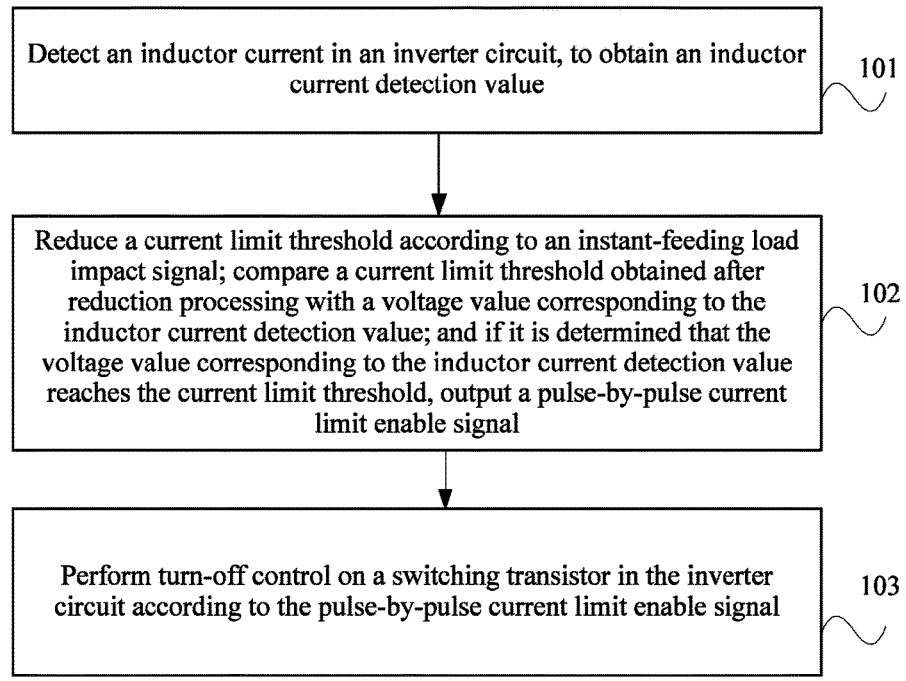
FIG. 7 is a flowchart of Embodiment 1 of an overcurrent protection method for an inverter circuit according to the present application.

FIG. 7 is a flowchart of Embodiment 1 of an overcurrent protection method for an inverter circuit according to the present application. As shown in FIG. 7, the method in this embodiment may include:

Step 101: Detect an inductor current in the inverter circuit, to obtain an inductor current detection value.

Step 102: Reduce a current limit threshold according to an instant-feeding load impact signal; compare a current limit threshold obtained after reduction processing with a voltage value corresponding to the inductor current detection value; and if it is determined that the voltage value corresponding to the inductor current detection value reaches the current limit threshold, output a pulse-by-pulse current limit enable signal.

An inductor voltage in the inverter circuit is detected, to obtain an inductor voltage detection value; and if it is determined that the inductor voltage detection value reaches a preset voltage threshold, the instant-feeding load impact signal is generated. Reduction processing is performed on the current limit threshold after the instant-feeding load impact signal is generated according to the inductor voltage detection value.

Step 103: Perform turn-off control on a switching transistor in the inverter circuit according to the pulse-by-pulse current limit enable signal.

The performing turn-off control on a switching transistor in the inverter circuit according to the pulse-by-pulse current limit enable signal may specifically be: performing level conversion on the pulse-by-pulse current limit enable signal, to obtain an overcurrent logic signal; and performing turn-off control on the switching transistor in the inverter circuit according to the overcurrent logic signal.

Optionally, the foregoing instant-feeding load impact signal may further be obtained in the following manner: detecting an output current in the inverter circuit, to obtain an output-current detection value; and if it is determined that the output-current detection value reaches a preset current threshold, generating the instant-feeding load impact signal.

In this embodiment, an instant-feeding load impact signal is generated according to an inductor voltage detection value, and specifically, when the inductor voltage detection value reaches a preset voltage threshold, the instant-feeding load impact signal is generated; a current limit threshold is reduced according to the instant-feeding load impact signal; the reduced current limit threshold is compared with a voltage value corresponding to an inductor current detection value in an inverter circuit; when a voltage value corresponding to the inductor current detection value reaches the reduced current limit threshold, a pulse-by-pulse current limit enable signal is output; and turn-off control is performed on a switching transistor in the inverter circuit according to the pulse-by-pulse current limit enable signal, so that current limiting protection for the switching transistor is implemented in advance by reducing the current limit threshold according to an inductor voltage. In the foregoing solutions of this embodiment, a current limiting protection operation takes effect before an inductor current is greater than an overcurrent protection reference current, thereby preventing damage to the switching transistor that is caused by overcurrent when the switching transistor is actually turned off. The overcurrent protection method for the inverter circuit is used to implement current limiting protection for the switching transistor, and has high reliability.

Figure 8:
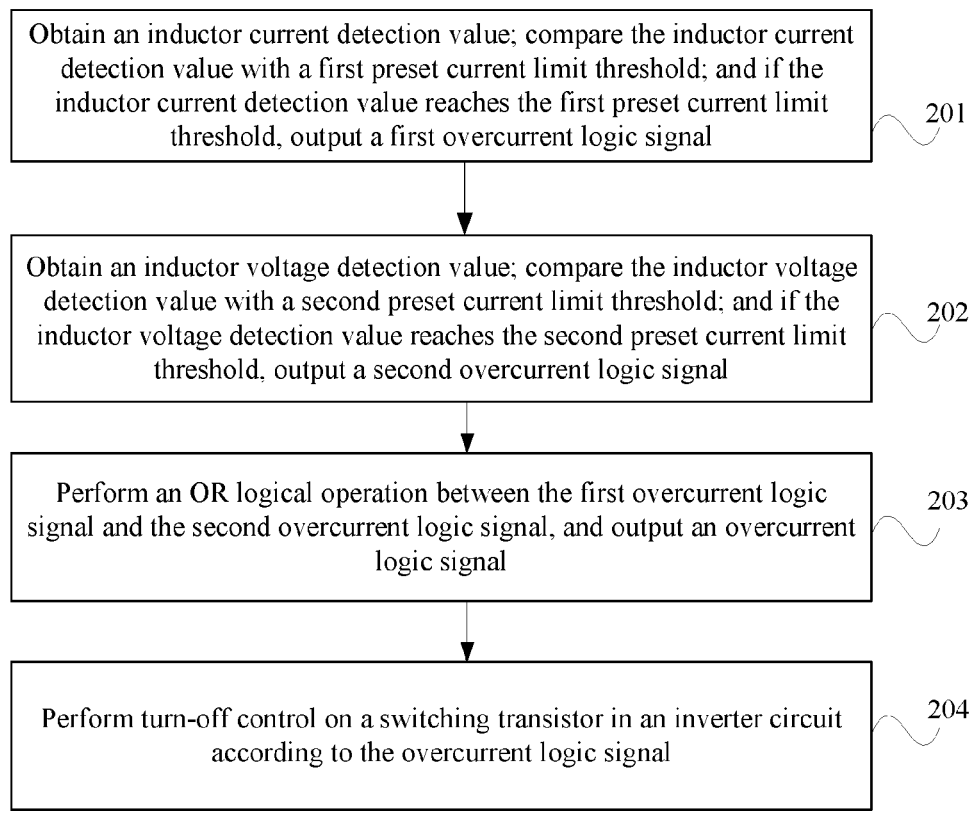
FIG. 8 is a flowchart of Embodiment 2 of an overcurrent protection method for an inverter circuit according to the present application.

FIG. 8 is a flowchart of Embodiment 2 of an overcurrent protection method for an inverter circuit according to the present application. As shown in FIG. 8, the method in this embodiment may include:

Step 201: Obtain an inductor current detection value; compare the inductor current detection value with a first preset current limit threshold; and if the inductor current detection value reaches the first preset current limit threshold, output a first overcurrent logic signal.

Optionally, step 201 may specifically be: detecting an inductor current in the inverter circuit, to obtain the inductor current detection value; comparing a voltage value corresponding to the inductor current detection value with the first preset current limit threshold; if it is determined that the voltage value corresponding to the inductor current detection value reaches the first preset current limit threshold, generating a first pulse-by-pulse current limit enable signal; and performing level conversion on the first pulse-by-pulse current limit enable signal, and outputting the first overcurrent logic signal.

Step 202: Obtain an inductor voltage detection value; compare the inductor voltage detection value with a second preset current limit threshold; and if the inductor voltage detection value reaches the second preset current limit threshold, output a second overcurrent logic signal.

Optionally, step 202 may specifically be: detecting an inductor voltage in the inverter circuit, to obtain the inductor voltage detection value; comparing the inductor voltage detection value with the second preset current limit threshold; if it is determined that the inductor voltage detection value reaches the second preset current limit threshold, generating a second pulse-by-pulse current limit enable signal; and performing level conversion on the second pulse-by-pulse current limit enable signal, and outputting the second overcurrent logic signal.

Step 203: Perform an OR logical operation between the first overcurrent logic signal and the second overcurrent logic signal, and output an overcurrent logic signal.

Step 204: Perform turn-off control on a switching transistor in an inverter circuit according to the overcurrent logic signal.

In this embodiment, an inductor voltage in an inverter circuit is detected; an inductor voltage detection value is compared with a preset current limit threshold; when the inductor voltage detection value is greater than or equal to the preset current limit threshold, a second pulse-by-pulse current limit enable signal is generated; and level conversion is performed on the second pulse-by-pulse current limit enable signal to generate a second overcurrent logic signal. In addition, an inductor current in the inverter circuit is detected; a voltage corresponding to an inductor current detection value is compared with a preset current limit threshold; when the inductor current detection value is greater than or equal to the preset current limit threshold, a first pulse-by-pulse current limit enable signal; level conversion is performed on the first pulse-by-pulse current limit enable signal to generate a first overcurrent logic signal; and an OR operation is performed between the second overcurrent logic signal that is generated according to the inductor voltage detection value and the first overcurrent logic signal that is generated according to the inductor current detection value. In this way, an overcurrent logic signal is generated according to either the inductor voltage or the inductor current, so that there is an overcurrent logic signal for performing turn-off control on a switching transistor in the inverter circuit. Due to a characteristic that the inductor voltage is ahead of the inductor current, current limiting protection for the switching transistor may be implemented in advance in this embodiment. Moreover, when the voltage between two ends of an inductor is not greater than a preset threshold, the current passing through the two ends of the inductor also reaches a relatively high current value as long as there is enough time. Therefore, in this embodiment, current limiting protection for the switching transistor in the inverter circuit is further implemented by detecting the inductor current in the inverter circuit. The overcurrent protection method for the inverter circuit in this embodiment has high reliability.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. An overcurrent protection system for an inverter circuit, comprising:
   an inductor current detection circuit configured to detect an inductor current in the inverter circuit, to obtain an inductor current detection value;
   a pulse-by-pulse current limit enable signal generation circuit connected to the inductor current detection circuit and configured to reduce a first current limit threshold according to an instant-feeding load impact signal, compare a second current limit threshold obtained after reduction processing with a voltage value corresponding to the inductor current detection value, and output a pulse-by-pulse current limit enable signal when the voltage value corresponding to the inductor current detection value reaches the second current limit threshold obtained after the reduction processing;
   a control circuit connected to the pulse-by-pulse current limit enable signal generation circuit and configured to perform turn-off control on a switching transistor in the inverter circuit according to the pulse-by-pulse current limit enable signal; and
   a first instant-feeding load impact signal generation circuit connected to the pulse-by-pulse current limit enable signal generation circuit and configured to detect an inductor voltage in the inverter circuit to obtain an inductor voltage detection value, and generate the instant-feeding load impact signal when the inductor voltage detection value reaches a preset voltage threshold.

2. The overcurrent protection system according to claim 1, wherein the first instant-feeding load impact signal generation circuit comprises:
   a voltage detection circuit, configured to detect the inductor voltage in the inverter circuit to obtain the inductor voltage detection value; and
   a first load impact enable signal generation circuit, separately connected to the voltage detection circuit and the pulse-by-pulse current limit enable signal generation circuit, and configured to compare the inductor voltage detection value with the preset voltage threshold, and, generate the instant-feeding load impact signal in response to determining that the inductor voltage detection value reaches the preset voltage threshold.

3. The overcurrent protection system according to claim 1, wherein the control circuit comprises:
   a level conversion circuit connected to the pulse-by-pulse current limit enable signal generation circuit and configured to perform level conversion on the pulse-by-pulse current limit enable signal to obtain an overcurrent logic signal; and
   a pulse-by-pulse current-limited circuit connected to the level conversion circuit and configured to perform turn-off control on the switching transistor in the inverter circuit according to the overcurrent logic signal.

4. The overcurrent protection system according to claim 1, further comprising:
   a second instant-feeding load impact signal generation circuit connected to the pulse-by-pulse current limit enable signal generation circuit and configured to detect an output current in the inverter circuit, to obtain an output-current detection value, and generate the instant-feeding load impact signal in response to determining that the output-current detection value reaches a preset current threshold; and
   a selection circuit, separately connected to the first instant-feeding load impact signal generation circuit, the second instant-feeding load impact signal generation circuit, and the pulse-by-pulse current limit enable signal generation circuit, and configured to select the instant-feeding load impact signal generated by the first instant-feeding load impact signal generation circuit or the second instant-feeding load impact signal generation circuit to be output to the pulse-by-pulse current limit enable signal generation circuit.

5. The overcurrent protection system according to claim 4, wherein the second instant-feeding load impact signal generation circuit comprises:
   a current detection circuit, configured to detect the output current in the inverter circuit to obtain the output-current detection value; and
   a second load impact enable signal generation circuit separately connected to the current detection circuit and the pulse-by-pulse current limit enable signal generation circuit and configured to compare the output-current detection value with the preset current threshold, and generate the instant-feeding load impact signal in response to determining that the output-current detection value reaches the preset current threshold.

6. An overcurrent protection method for an inverter circuit, comprising:
   detecting an inductor current in the inverter circuit, to obtain an inductor current detection value;
   reducing a first current limit threshold according to an instant-feeding load impact signal;
   comparing a second current limit threshold obtained after reduction processing with a voltage value corresponding to the inductor current detection value;
   outputting a pulse-by-pulse current limit enable signal in response to determining that the voltage value corresponding to the inductor current detection value reaches the second current limit threshold obtained after the reduction processing;
   performing turn-off control on a switching transistor in the inverter circuit according to the pulse-by-pulse current limit enable signal;
   detecting an inductor voltage in the inverter circuit, to obtain an inductor voltage detection value; and
   generating the instant-feeding load impact signal in response to determining that the inductor voltage detection value reaches a preset voltage threshold.

7. The overcurrent protection method according to claim 6, wherein the performing turn-off control comprises:
   performing level conversion on the pulse-by-pulse current limit enable signal, to obtain an overcurrent logic signal; and
   performing turn-off control on the switching transistor in the inverter circuit according to the overcurrent logic signal.

8. The overcurrent protection method according to claim 6, further comprising:
  detecting an output current in the inverter circuit, to obtain an output-current detection value; and
  generating the instant-feeding load impact signal in response to determining that the output-current detection value reaches a preset current threshold.

9. An overcurrent protection system for an inverter circuit, comprising:
  a first current-limited circuit, configured to obtain an inductor current detection value, compare a voltage value corresponding to the inductor current detection value with a first preset current limit threshold, and output a first overcurrent logic signal when the voltage value corresponding to the inductor current detection value reaches the first preset current limit threshold;
  a second current-limited circuit, configured to obtain an inductor voltage detection value, compare the inductor voltage detection value with a second preset current limit threshold, and output a second overcurrent logic signal in response to the inductor voltage detection value reaching the second preset current limit threshold; and
  a pulse-by-pulse current-limited circuit, connected to the first current-limited circuit and the second current-limited circuit, and configured to perform an OR logical operation between the first overcurrent logic signal and the second overcurrent logic signal, to generate an overcurrent logic signal, and perform turn-off control on a switching transistor in the inverter circuit according to the overcurrent logic signal.

10. The overcurrent protection system according to claim 9, wherein the first current-limited circuit comprises:
  an inductor current detection circuit configured to detect an inductor current in the inverter circuit to obtain the inductor current detection value;
  a first pulse-by-pulse current limit enable signal generation circuit connected to the inductor current detection circuit and configured to compare a voltage value corresponding to the inductor current detection value with the first preset current limit threshold, and generate a first pulse-by-pulse current limit enable signal in response to determining that the voltage value corresponding to the inductor current detection value reaches the first preset current limit threshold; and
  a first level conversion circuit, separately connected to the first pulse-by-pulse current limit enable signal generation circuit and an OR logic circuit, and configured to perform level conversion on the first pulse-by-pulse current limit enable signal, and output the first overcurrent logic signal.

11. The overcurrent protection system according to claim 9, wherein the second current-limited circuit comprises:
  an inductor voltage detection circuit configured to detect an inductor voltage in the inverter circuit to obtain the inductor voltage detection value;
  a second pulse-by-pulse current limit enable signal generation circuit connected to the inductor voltage detection circuit and configured to compare the inductor voltage detection value with the second preset current limit threshold, and generate a second pulse-by-pulse current limit enable signal in response to determining that the inductor voltage detection value reaches the second preset current limit threshold; and a second level conversion circuit, separately connected to the second pulse-by-pulse current limit enable signal generation circuit and an OR logic circuit, and configured to perform level conversion on the second pulse-by-pulse current limit enable signal, and output the second overcurrent logic signal.

12. An overcurrent protection method for an inverter circuit, comprising:
  obtaining an inductor current detection value;
  comparing the inductor current detection value with a first preset current limit threshold;
  outputting a first overcurrent logic signal in response to the inductor current detection value reaching the first preset current limit threshold;
  obtaining an inductor voltage detection value;
  comparing the inductor voltage detection value with a second preset current limit threshold;
  outputting a second overcurrent logic signal in response to the inductor voltage detection value reaching the second preset current limit threshold;
  performing an OR logical operation between the first overcurrent logic signal and the second overcurrent logic signal, and outputting an overcurrent logic signal; and
  performing turn-off control on a switching transistor in the inverter circuit according to the overcurrent logic signal.

13. The overcurrent protection method according to claim 12, wherein the obtaining the inductor current detection value, the comparing the inductor current detection value with the first preset current limit threshold, and the outputting the first overcurrent logic signal comprise:
  detecting an inductor current in the inverter circuit, to obtain the inductor current detection value;
  comparing a voltage value corresponding to the inductor current detection value with the first preset current limit threshold;
  generating a first pulse-by-pulse current limit enable signal in response to determining that the voltage value corresponding to the inductor current detection value reaches the first preset current limit threshold; and
  performing level conversion on the first pulse-by-pulse current limit enable signal, and outputting the first overcurrent logic signal.

14. The overcurrent protection method according to claim 12, wherein obtaining the inductor voltage detection value, comparing the inductor voltage detection value with the second preset current limit threshold, and outputting the second overcurrent logic signal in response to the inductor voltage detection value reaching the second preset current limit threshold comprises:
  detecting an inductor voltage in the inverter circuit, to obtain the inductor voltage detection value;
  comparing the inductor voltage detection value with the second preset current limit threshold;
  generating a second pulse-by-pulse current limit enable signal in response to determining that the inductor voltage detection value reaches the second preset current limit threshold; and
  performing level conversion on the second pulse-by-pulse current limit enable signal, and outputting the second overcurrent logic signal.

* * * * *